Figure 1:
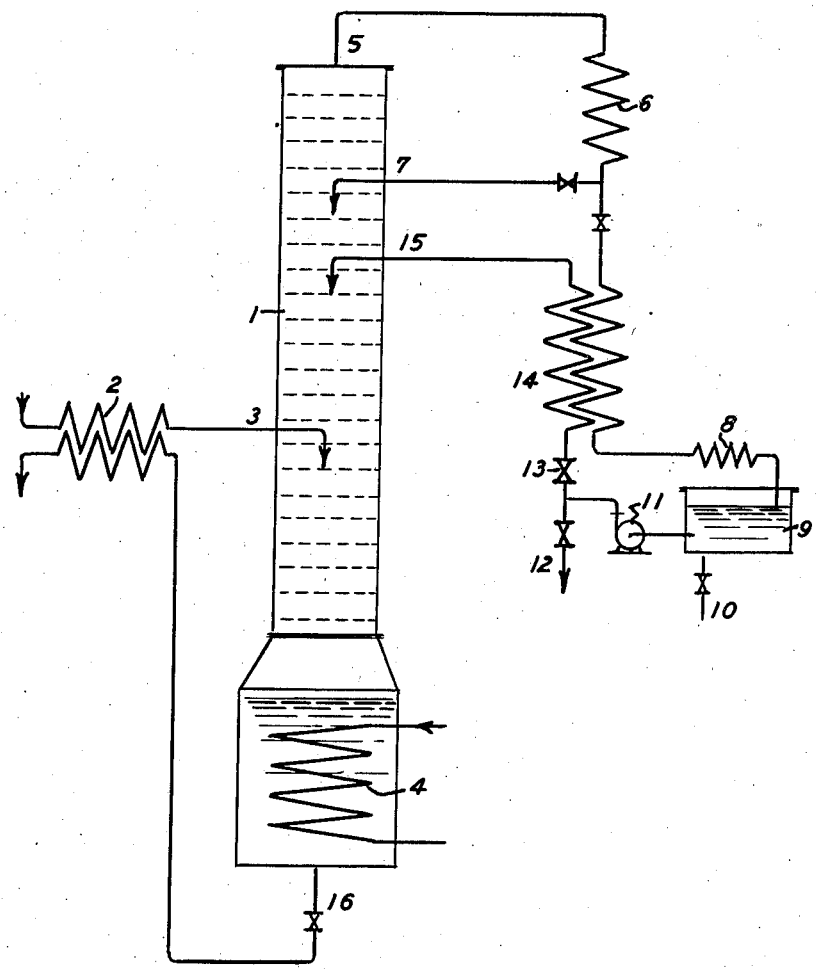

UNITED STATES PATENT OFFICE 2,086,856

RECOVERY OF PHENOLS FROM AQUEOUS SOLUTIONS

Wilhelm Deiters, Paul Herold, Paul Koppe, and Fritz Lüttge, Leuna, Germany, assignors to I. G. Farbenindustrie Aktiengesellschaft, Frankfort-on-the-Main, Germany Application January 9, 1935, Serial No. 1,072
In Germany January 18, 1934

5 Claims. (Cl. 260—154)

The present invention relates to the recovery of phenols from aqueous solutions.

In industry it is frequently necessary to recover phenols from aqueous solutions containing them. Such is the case for example in the removal of phenols from industrial waste liquors such as are obtained for example in low temperature carbonization plants, coke ovens or destructive hydrogenation plants. The said waste liquors must be freed from their phenol content before being discharged into rivers or other water.

For the said purpose it has already been proposed to extract the waste aqueous liquors with solvents for phenols which are insoluble in water, as for example benzene or tricresyl phosphate. In such extraction processes, especially when working with tricresyl phosphate, there are drawbacks in that certain constituents present in the waste liquors, the nature of which is not more closely known, act as emulsifying agents and lead to the formation of emulsions between the aqueous liquid and the extraction agent. The industrial use of the said extraction processes is therefore rendered unsatisfactory because the degree of efficiency of the extraction is impaired, the output of the plant is decreased and there are losses of extraction agent.

We have now found that phenols can be recovered from aqueous solutions of all kinds, especially from waste aqueous liquors, without the said drawbacks by subjecting the aqueous solutions to a rectifying distillation by means of a distillation column. It has been found, contrary to expectation, that even when the aqueous solutions are contaminated by considerable amounts of salts and other substances, the whole of the phenols may be expelled therefrom at a temperature below the boiling point of water by a distillation of the said kind although the boiling point of the mixture of water and the phenols is frequently less than 1° C. below the boiling point of pure water. The distillate consists of an aqueous condensate which is comparatively rich in phenols and contains a large proportion of the phenols originally contained in the aqueous solution. The distillation may be so carried out that the aqueous solutions are freed to any desired extent from their phenol contents, so that after distillation the solutions may be discharged without risk into rivers or other waters even under difficult conditions.

The aqueous condensates formed during the distillation are frequently of such high concentration that when cooled they no longer remain homogeneous but form two layers of which one consists almost exclusively of the phenols while the other consists of a saturated aqueous solution of the phenols. By separating these layers from each other a part of the phenols may be recovered directly.

The aqueous layer may be freed from its phenol content without any difficulty by one of the known extraction processes, as for example by means of tricresyl phosphate. It is advantageous not to endeavor to remove the phenols as completely as possible from the aqueous condensate, but to subject the condensate, after the major portion of the phenols has been removed therefrom by extraction, to a fresh distillation, preferably together with fresh amounts of the original aqueous solution to be treated.

The aqueous layer of the condensate may also be added directly to the aqueous solution to be treated. Generally speaking, however, it is preferable, by reason of the usually great difference in concentration between the original aqueous solution and the aqueous layer of the condensate, to introduce the aqueous layer directly at a suitable place in the distillation column after being warmed again, for example by heat exchange with the hot liquid leaving the condenser of the column.

The process may be carried out at atmospheric, increased or reduced pressure. The distillation column may be of any usual construction, as for example one provided with filler bodies or a bell-type column.

When the process according to this invention is used for the treatment of waste waters which contain free ammonia or ammonia in the form of volatile compounds, there is a strong enrichment of ammonia in the upper part of the rectification column which injuriously affects the degree of efficiency of the process. In such cases the rectifying action of the column can be considerably increased by carrying out the rectifying distillation in the presence of carbon dioxide or a gas containing the same. The carbon dioxide may be led directly into the column or carbon dioxide may be added to the waste water before it enters the column. In this manner not only is a more far-reaching removal of phenols from the waste water effected than when not employing carbon dioxide, but the consumption of steam necessary for the rectification is also reduced. At the same time, by working in the said manner, a considerably better separation of the phenols from the saturated phenol solutions is effected. Any hydrogen sulphide contained in the crude waters is expelled by the added carbon dioxide and moreover the phenols are obtained in a considerably purer form.

The carbon dioxide is removed together with the ammonia in a suitable manner from the circulation of the hot condensate. The ammonium carbonate solution thus obtained may be further worked up into ammonium sulphate.

The process according to this invention is especially valuable for the treatment of waste waters from the low temperature carbonization of brown coal and the destructive hydrogenation of brown coal, which frequently contain ammonia and it makes possible not only the recovery of pure phenols but also at the same time the recovery of the ammonia present in the waste waters in an economical manner.

Figure 2:
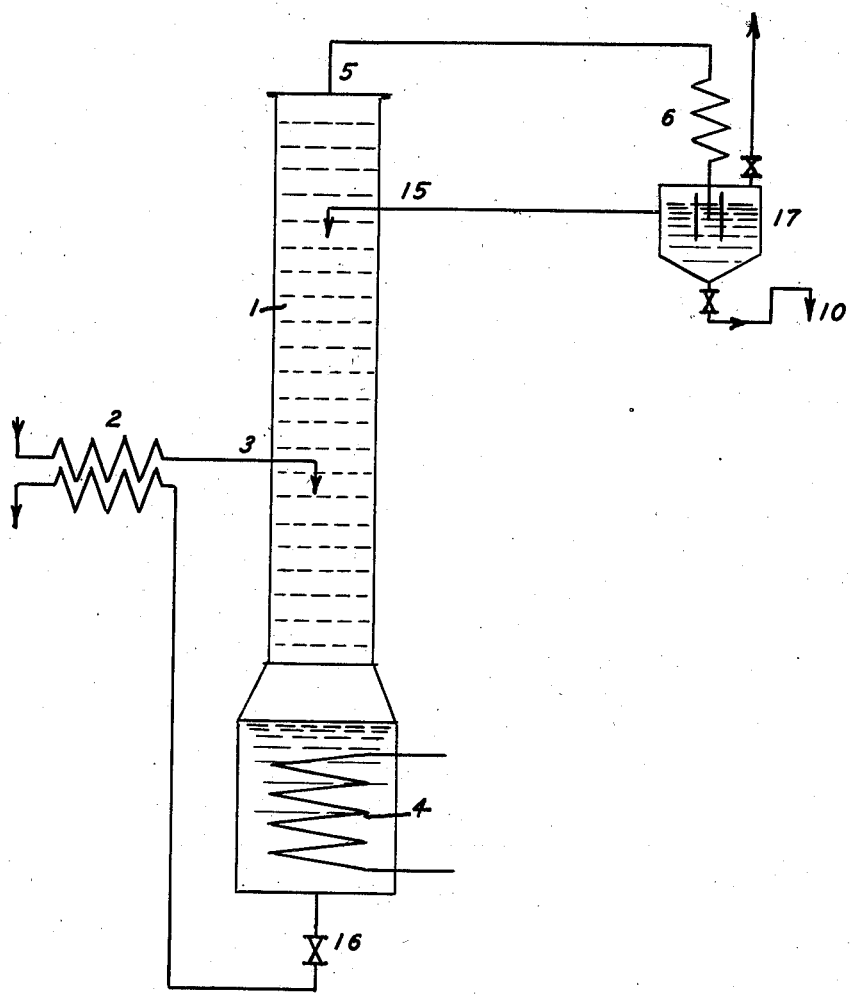

The following examples given with reference to the accompanying drawings which illustrate an arrangement of apparatus in accordance with this invention will further illustrate how this invention may be carried out in practice but the invention is not restricted to these examples. Example 1 is given with reference to Fig. 1 of the accompanying drawings and Example 6 with reference to Fig. 2. These drawings diagrammatically illustrate certain arrangements of apparatus suitable for carrying out the present process, but the invention is not restricted to the use of the particular arrangements shown.

Example 1

400 liters of a waste aqueous liquor containing about 6 grams of phenols per liter are introduced per hour into a distillation column 1 through a heat exchanger 2 at 3. The liquid is caused to boil by a heating coil 4 provided in the lower part of the column. After a far-reaching fractionation, the vapors leave the column at 5 and pass into a condenser 6 in which they are cooled to such an extent that complete condensation takes place. The greater part of the condensate formed is returned to the column at 7 as a reflux while the smaller part passes through a cooler 8 into a collecting vessel 9, the relative rate of flow of the liquid in the two directions being controlled by valves in the pipe lines. In the vessel 9 about 60 liters per hour of distillate containing about 38.5 grams of phenols per liter are obtained; only about 30 grams are capable of dissolving in water at ordinary temperature and the remaining about 8.5 grams separate as an oil which may be withdrawn continuously through a pipe 10. The aqueous part of the condensate is withdrawn from the collecting vessel 9 by a pump 11 and supplied to one of the usual extraction plants through a pipe 12. The waste aqueous liquor leaving the lower part of the column in an amount of about 340 liters per hour contains only 0.3 gram of phenols per liter; its heat content is utilized in the heat exchanger 2.

Example 2

A distillation column as described in Example 1 is supplied per hour with 400 liters of a waste water containing about 6 grams of phenols per liter, corresponding to an amount of 2.4 kilograms of phenols per hour. The distillation is carried through in the manner described in Example 1, but only a comparatively small amount of the condensate formed, namely 130 liters per hour is reintroduced into the column as a reflux at 7, whereas the greater portion of the condensate is supplied through the cooler 8 into the collecting vessel 9. In this vessel there are obtained per hour 270 liters of distillate containing 38.5 grams of phenols per liter and from this amount of liquid 8.5 grams per liter (corresponding to 2.3 kilograms per hour) are separated as phenols in the oily state which are withdrawn through the pipe 10. The aqueous portion of the condensate containing about 30 grams of phenols per liter is supplied by way of a pipe 13 into a heat-exchanger 14 and is then reintroduced into the column at 15.

Example 3

The apparatus described in Example 1 is modified by arranging a settling tank in place of the cooler 8, the collecting vessel 9 and the heat-exchanger 14. The column is supplied per hour with 400 liters of a waste water containing about 6 grams of phenols per liter and the distillation is carried through in the manner described in Example 1. The whole condensate is cooled in the settling tank to such an extent that per liter so much phenols are separated as the waste water supplied to the column contains per liter, i. e. so that 6 grams of phenols separate, for which purpose a cooling of for example from 87° to 84° C. is necessary. The aqueous layer of the condensate which contains 32.5 grams of phenols per liter is reintroduced into the column.

Example 4

The distillation column described in Example 1 is supplied per hour with 400 liters of a waste water containing about 2.3 grams of phenols per liter (corresponding to 0.92 kilogram of phenols per hour). The distillation is carried through in the manner described in Example 1. The distillate obtained contains 38.5 grams of phenols per liter. A portion of the condensate formed is reintroduced into the column at 7 as a reflux, whereas the remainder in an amount of 108 liters per hour passes through the cooler 8 into the collecting vessel 9. In this vessel 8.5 grams of phenols separate from each liter as an oily liquid (corresponding to 918 grams per hour). The aqueous saturated solution is reintroduced into the column by way of the pipe 13 and the heat-exchanger 14 at 15. From the distillation vessel 400 liters of water practically free from phenols are withdrawn per hour.

Example 5

400 liters of a waste water containing about 0.5 per cent of ammonia and about 4.8 grams of phenols per liter are led per hour into the distillation column described in Example 1. Before being introduced into the column, the waste water is laden with carbon dioxide by leading into it 1.6 cubic meters of carbon dioxide per hour. The waste water is then brought to boiling by the heating coil provided in the lower part of the heating column and further treated as described in the said Example 1. The greater part of the condensate is returned to the column as a reflux, while a smaller part passes through the condenser into the collecting vessel. During each hour there are obtained in the collecting vessel 20 liters of distillate containing 90 grams of phenols per liter of which the amount in excess of 30 grams per liter separates as an oil while the remainder is supplied to an extraction plant.

By working without the addition of carbon dioxide but under otherwise identical conditions, there are obtained per hour in the collecting vessel 27 liters of distillate containing only 67 grams of phenols per liter. This distillate by reason of its high alkalinity contrasted with the product obtained when working with an addition of carbon dioxide does not separate into two layers and must be supplied in its entirety to the extraction plant.

Example 6

400 liters of a waste water containing per liter 3 grams of ammonia and 6 grams of phenols are introduced into a distillation column 1 at 3 by way of a heat-exchanger 2. Before the water is introduced into the column it is laden with 1 cubic meter of carbon dioxide per hour. The liquid is heated to boiling by means of a heating coil 4 arranged in the lower part of the column. The vapors leave the column at 5 and pass into a cooler 6 in which they are cooled so far that complete condensation takes place. The condensate is cooled by a few degrees C. in the settling tank 17 to such an extent that per liter so much phenols are separated as an oily liquid, as the waste water supplied to the column contains per liter, namely 6 grams. For this purpose cooling for example from 93° to 90° C. is necessary. The saturated aqueous solution which contains 52 grams of phenols per liter is reintroduced into the column at 15 as reflux liquid.

What we claim is:

1. The process for the recovery of phenols from an aqueous solution containing the same which comprises subjecting said solution to a rectifying distillation, withdrawing separated phenols from the resulting distillate and subjecting the remainder of the distillate to extraction by means of a solvent for phenols which is insoluble in water.

2. The process for the recovery of phenols from an aqueous solution containing the same which comprises subjecting said solution to a rectifying distillation, withdrawing separated phenols from the resulting distillate and reintroducing the remainder of the distillate into said rectifying distillation.

3. The process for the recovery of penols from an aqueous solution containing the same in addition to ammonia which comprises subjecting said solution to a rectifying distillation in the presence of carbon dioxide.

4. The process for the recovery of phenols from an aqueous solution containing the same in addition to ammonia which comprises subjecting said solution to a rectifying distillation in the presence of carbon dioxide, withdrawing separated phenols from the resulting distillate and reintroducing the remainder of the distillate into said rectifying distillation.

5. The process as claimed in claim 1, in which the aqueous solution is an industrial waste liquor containing phenols.

WILHELM DEITERS.
PAUL HEROLD.
PAUL KOPPE.
FRITZ LÜTTGE.